United States Patent [19]

le Duc

[11] 4,306,830
[45] Dec. 22, 1981

[54] CARGO HANDLING METHOD AND APPARATUS WITH RETRACTABLE FRICTION DRIVE

[75] Inventor: Donald le Duc, Santa Clara, Calif.

[73] Assignee: FMC Corporation, San Jose, Calif.

[21] Appl. No.: 82,186

[22] Filed: Oct. 5, 1979

[51] Int. Cl.³ .............................................. B65G 67/02
[52] U.S. Cl. .................................. 414/343; 414/529; 414/786
[58] Field of Search ............... 414/529, 340, 341, 343, 414/352, 373, 786; 198/583

[56] References Cited

U.S. PATENT DOCUMENTS

| | | |
|---|---|---|
| 2,087,846 | 7/1937 | Jahn . |
| 2,409,870 | 10/1946 | Kinnaird . |
| 3,011,665 | 12/1961 | Wise . |
| 3,115,975 | 12/1963 | Thompson .......................... 414/373 |
| 3,435,969 | 4/1969 | McCartney et al. . |
| 3,489,300 | 1/1970 | McCartney et al. . |
| 3,506,144 | 4/1970 | Carder et al. . |
| 3,655,075 | 4/1972 | Carder et al. . |
| 3,655,076 | 4/1972 | Carder et al. . |
| 3,722,716 | 3/1973 | Tantlinger . |
| 3,954,192 | 5/1976 | Watts .................................. 414/398 |
| 3,972,427 | 8/1976 | Stanley et al. . |
| 4,077,532 | 3/1978 | Bryan . |
| 4,129,229 | 12/1978 | Brown ................................ 221/129 |

*Primary Examiner*—Robert W. Saifer
*Attorney, Agent, or Firm*—A. J. Moore; R. B. Megley

[57] ABSTRACT

A method and apparatus is provided for transferring cargo between an unpowered roller bed and a powered roller bed by a self-propelled, mobile, steerable vehicle having a powered roller bed and a retractable friction drive on one end thereof. When transferring a cargo loaded pallet between the two powered roller beds, the friction drive retracts within one end of the vehicle chassis, and said end of the vehicle is moved into abutting engagement with the powered roller bed. When transferring a pallet between the vehicle's driven roller bed and an unpowered bed of interconnected rollers, the friction drive is extended to frictionally engage and drive the unpowered rollers in either direction. The specification also discloses an improved vehicle, per se, having a powered roller bed and a retractable, selectively operable friction drive for providing power to interconnected rollers of a roller bed.

20 Claims, 14 Drawing Figures

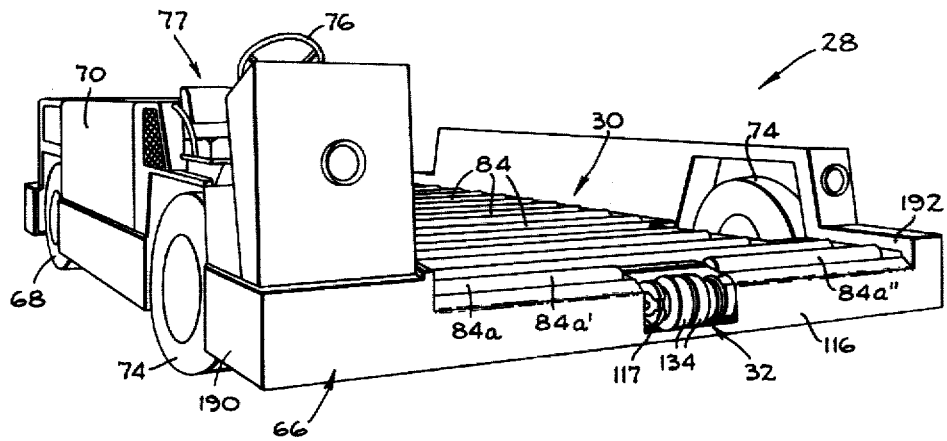
FIG_1
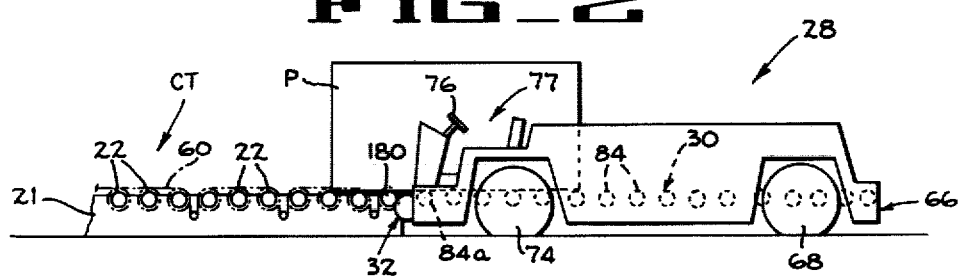
FIG_2
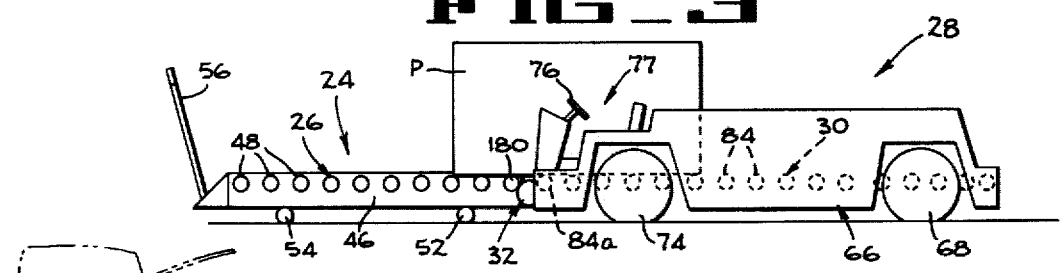
FIG_3
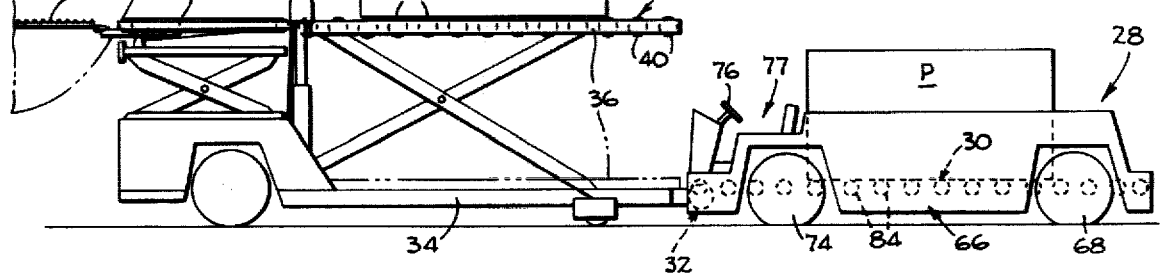
FIG_4

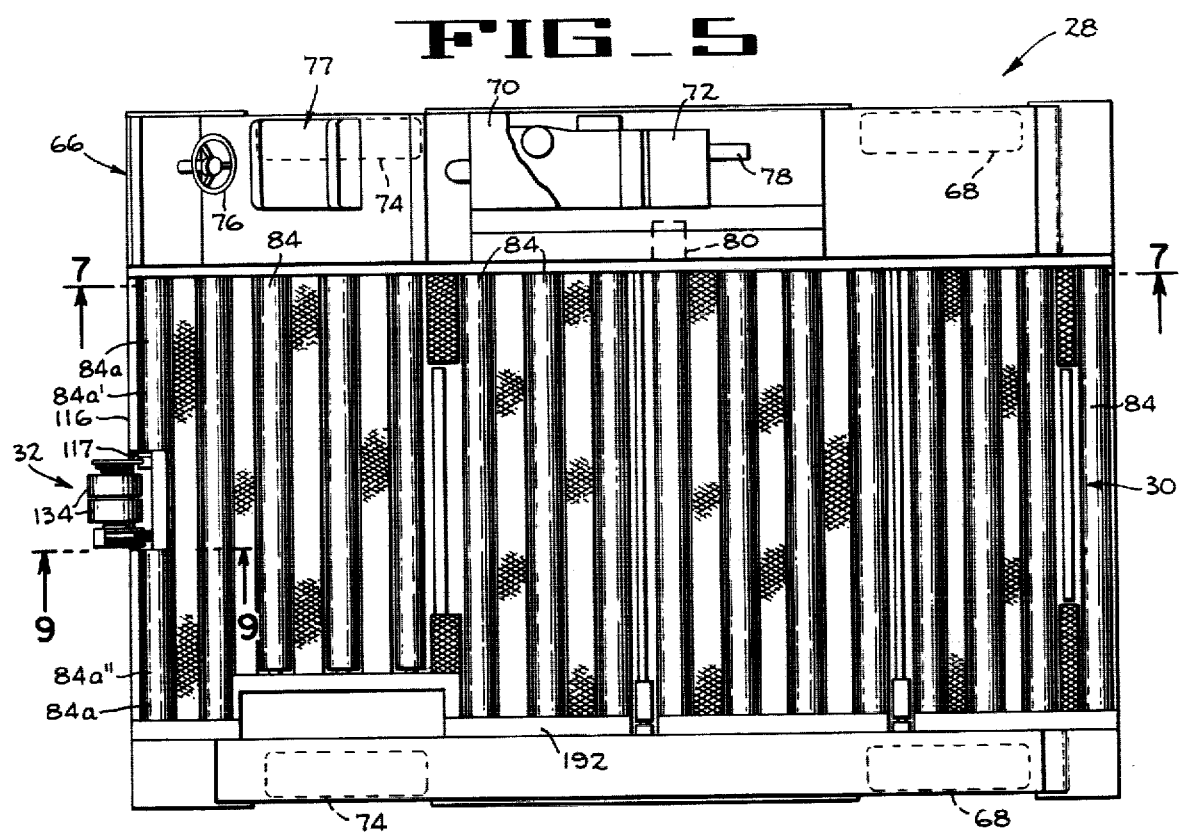
FIG_5
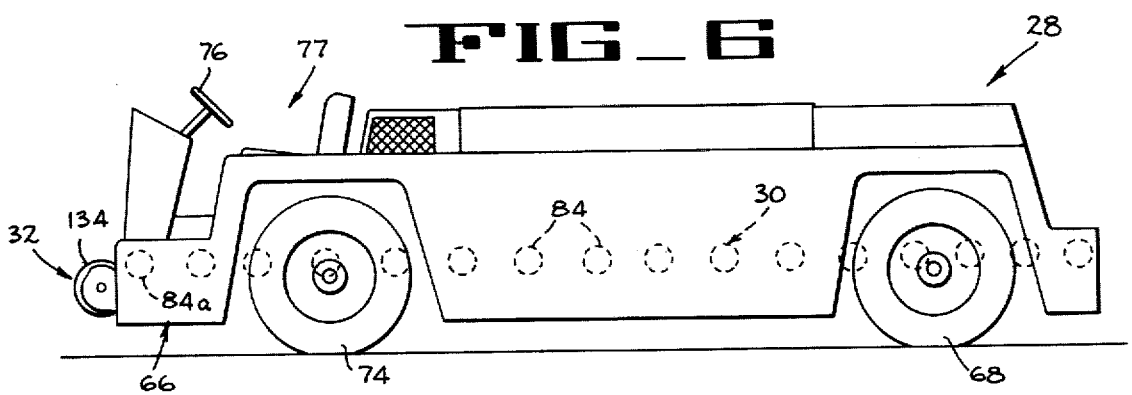
FIG_6
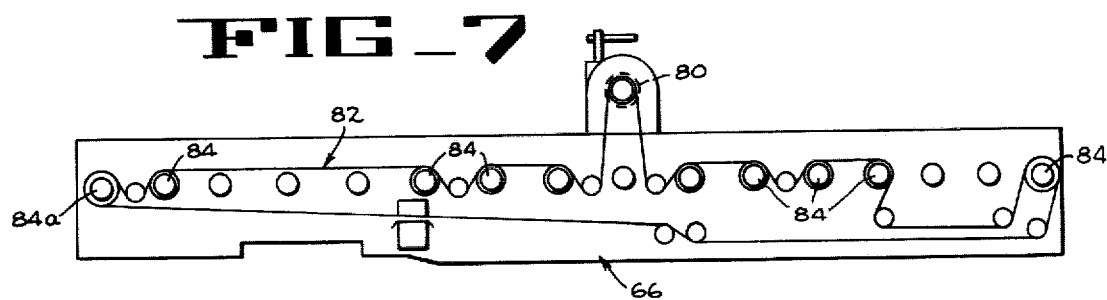
FIG_7

FIG_8
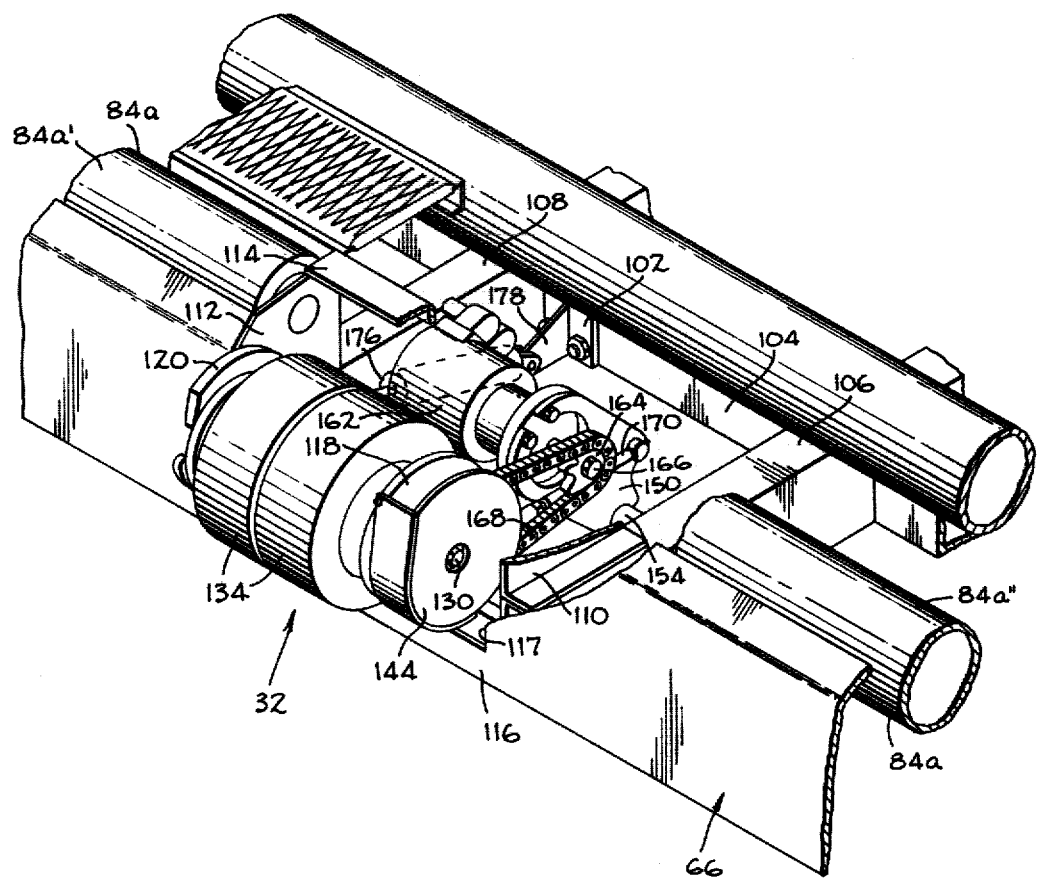
FIG_13
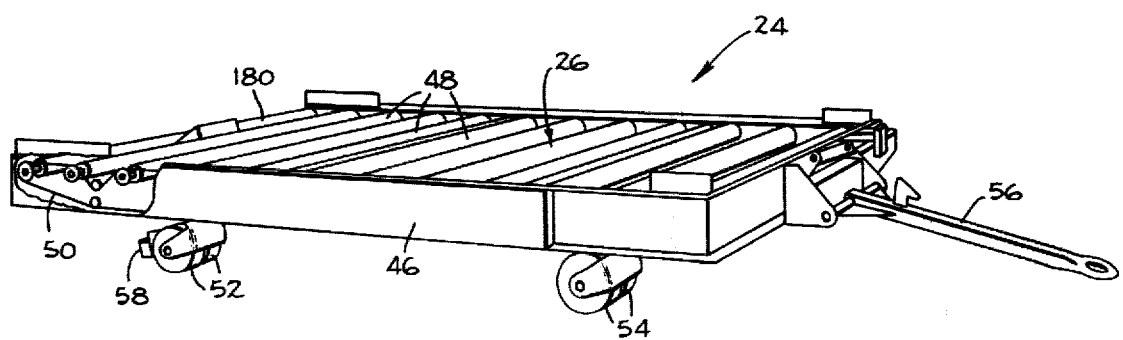

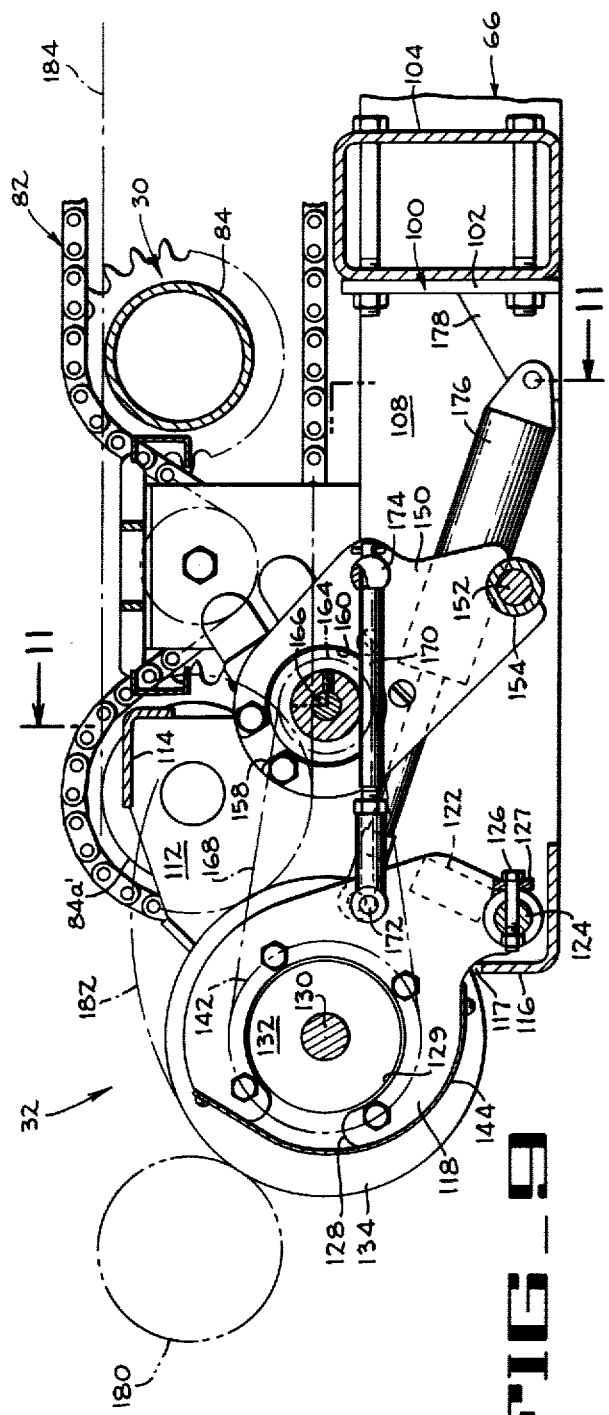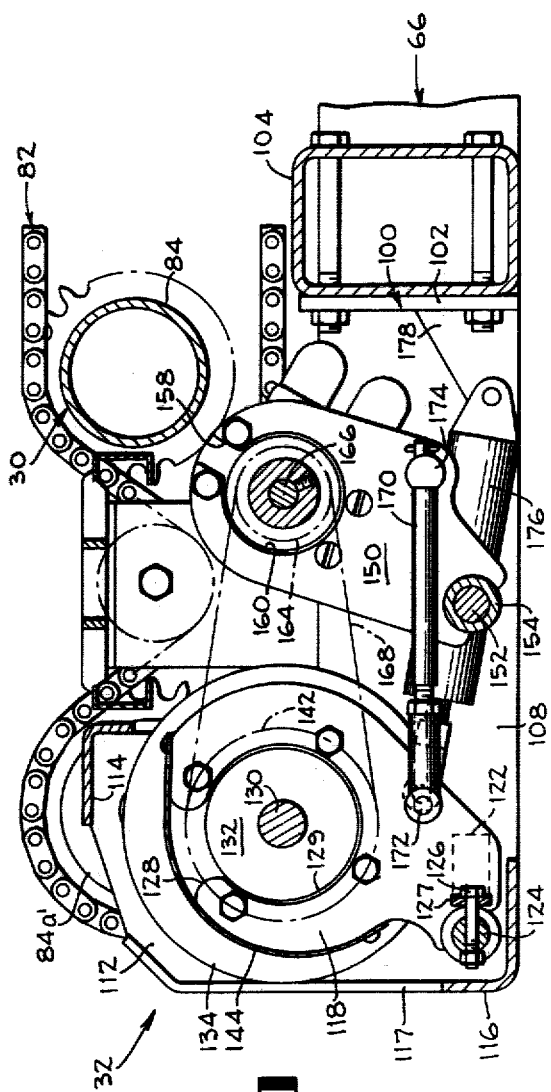
FIG_9  FIG_10

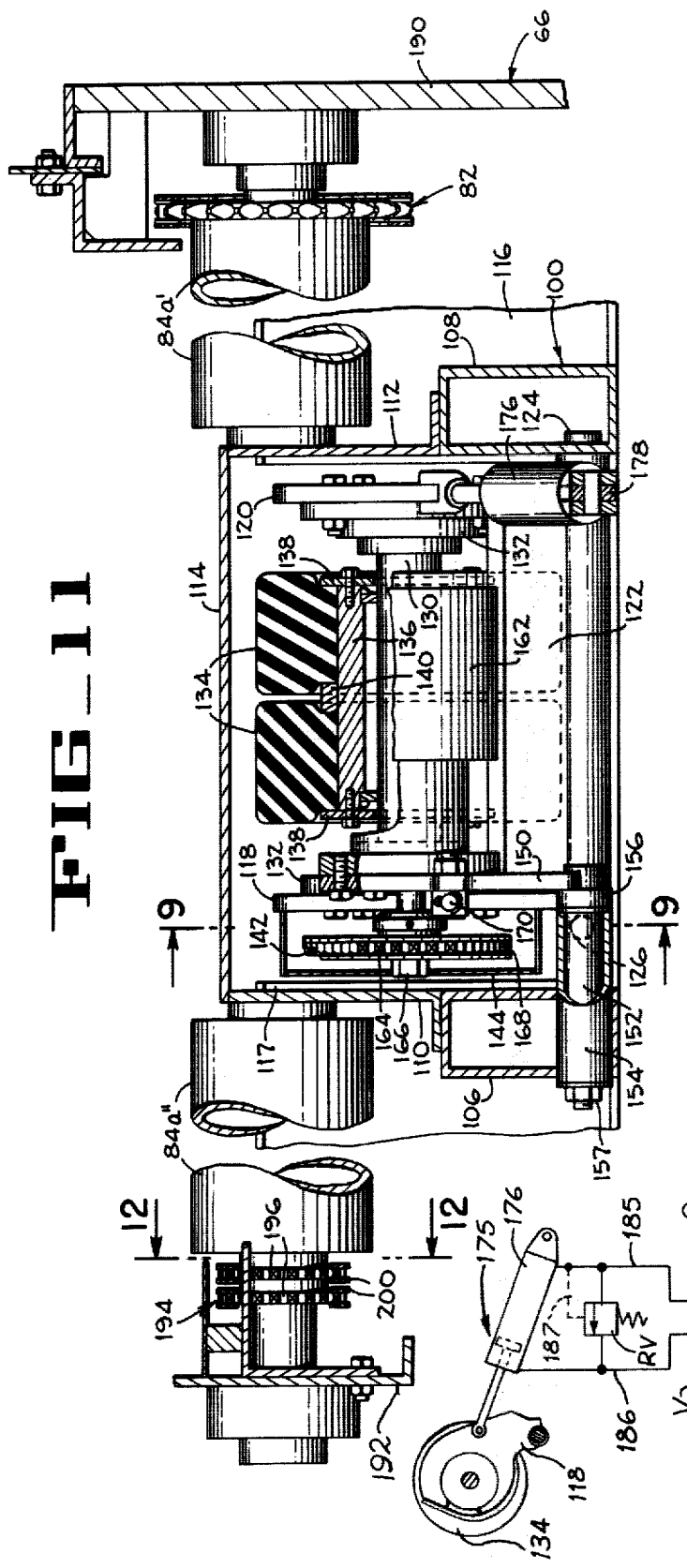
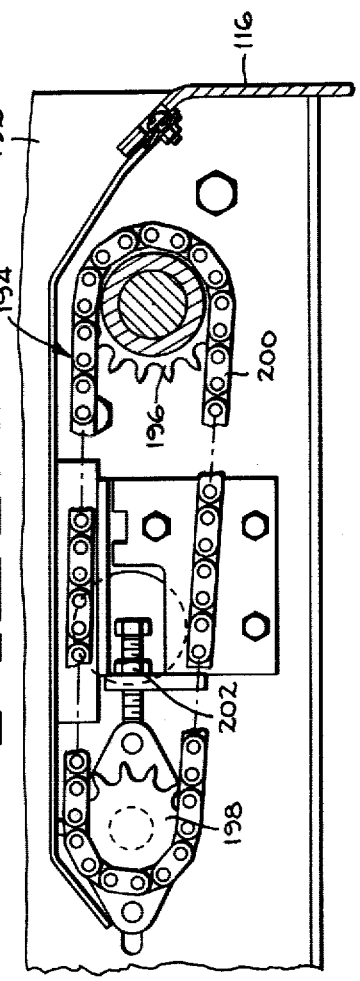

CARGO HANDLING METHOD AND APPARATUS WITH RETRACTABLE FRICTION DRIVE

BACKGROUND OF THE INVENTION

1. Field of the Invention

The present invention relates to a mobile cargo handling system which includes a vehicle having a driven roller bed, and more particularly relates to such a vehicle provided with a friction drive which is selectively movable between a position in driving engagement with an unpowered bed of rollers for transferring cargo onto or off of said unpowered bed, and a retracted position disposed within the chassis of the vehicle when the vehicle is in position to transfer cargo onto or off of an independently driven bed of rollers.

2. Description of Prior Art

Mobile vehicles for transferring cargo between powered rollers of an aircraft loader and unpowered rollers of terminal storage racks or mobile dollies at an airfield are well known in the art.

One such system is disclosed in Carder et al U.S. Pat. No. 3,506,144 which issued on Apr. 14, 1970. In the Carder et al system a loader is positioned adjacent the cargo opening of an aircraft and includes a driven roller bed that is raised and lowered between the levels of the cargo door of the aircraft and of an unpowered roller bed of a dolly or trailer. Each dolly is, in turn, connected to a tractor which moves the foremost roller of the dolly into frictional engagement with an extractor or friction roller drive. The friction roller drive is journaled on the rear end of the loader and is driven by a reversible hydraulic motor through a chain drive. When the friction roller engages the front roller of the dolly, all of the dolly rollers are driven to move the cargo which is supported on a pallet onto or off of the dolly. However, the Carder et al extractor roller is not retractable within the frame of the loader but is disposed in fixed position of the loader and projects outwardly from the rear end of the loader at all times. Also, the Carder et al extractor is mounted on the loader which is locked in position adjacent the aircraft until it is fully loaded or unloaded, and accordingly is not moved into operative engagement with unpowered rollers on a dolly or unpowered rollers at aircraft storage racks.

McCartney et al U.S. Pat. No. 3,489,300 which issued Jan. 3, 1970 discloses another system for transferring containers between a dolly or trailer and an aircraft loader. This system discloses a transporter with an anti-friction unpowered main roller bed and a pair of forwardly projecting tongues which support a pair of driven rollers that cooperate with another pair of driven rollers near the near end of the transporter. The four driven rollers are raised above the level of the unpowered rollers on the bed of the transporter. The cooperating pallet dolly includes unpowered rollers on its main body and also on spaced tongues which interfit with the transporter tongues. The front of the transporter is lowered to permit the cooperating tongues of the transporter and dolly to be moved into transfer position. The forward end of the transporter is then raised so that the forward drive rollers move above the main roller plane to frictionally engage a pallet thereon and drive the pallet onto or off of the dolly. When the pallet is to be transferred to the powered roller bed of an aircraft roller, the forward end of the transporter is moved into abutting engagement with the chassis of the loader. However, the driven transporter rollers in this system are not retractable and do not engage and drive the unpowered rollers of a dolly or the like but instead must be raised above the plane of the main roller deck so that the two forward rollers directly engage the bottom of the pallet. Also, the driven rollers are very narrow and therefore localize their driving forces to small areas of the pallet or article carried by the transporter.

SUMMARY OF THE INVENTION

The retractable friction drive included in the present invention is mounted on a driven vehicle that is provided with a full width driven roller bed for more uniformly supporting cargo, hereinafter referred to as articles or pallets. When it is desired to transfer the pallets between drivingly interconnected, but unpowered, roller beds of a terminal storage rack or of a dolly; the front end of the transporter is moved into transfer position adjacent the unpowered rollers, and the friction drive is extended forwardly of the transport chassis into frictional driving engagement with the foremost one of the unpowered rollers for selectively driving all unpowered rollers thereby moving the pallet onto or off of the transporter along a substantially horizontal supporting plane.

When the transporter is driven into transfer position with a loader or the like which includes a bed of powered rollers, the friction drive is retracted within the confines of a transporter chassis and also preferably below the pallet supporting plane of the rollers. At this time the chassis of the transporter and the chassis of the loader are moved into abutting engagement thereby providing a minimum gap between the adjacent end rollers of the transporter and loader thus providing more substantial support for the heavily loaded pallets and reducing damage to the pallets to a minimum.

BRIEF DESCRIPTION OF THE DRAWINGS

FIG. 1 is a perspective of a transporter having the retractable friction drive thereon, said drive being illustrated in its extended position.

FIG. 2 is an operational view illustrating the transporter of FIG. 1 in position to transfer pallets onto or off of an unpowered roller bed of a terminal storage rack with the friction drive extended to engage and drive the unpowered rollers.

FIG. 3 is an operational view similar to FIG. 2 but illustrating the friction drive of the transporter in position to drive pallets onto or off of the unpowered roller bed of a dolly, the tongue of the dolly being raised to set its brakes.

FIG. 4 is an operational view illustrating the friction drive in its retracted position, and the chassis of the transporter in abutting engagement with the chassis of the loader which is provided with a powered roller bed, said loader being positioned adjacent the cargo door of an aircraft and the bed being shown in two operative positions.

FIG. 5 is a plan view of a transporter with the friction drive being in its extended position.

FIG. 6 is a side elevation of the transporter of FIG. 5.

FIG. 7 is a diagrammatic section taken along lines 7—7 of FIG. 5 diagrammatically illustrating the drive for a plurality of the full width rollers of the transporters roller bed.

FIG. 8 is a perspective of the friction drive illustrated in its extended position, certain parts being cut away to better illustrate the friction drive.

FIG. 9 is an enlarged vertical section taken along lines 9—9 of FIGS. 5 and 11 illustrating the friction drive in its fully extended position.

FIG. 10 is an enlarged vertical section similar to FIG. 9 but illustrating the friction drive in its fully retracted position.

FIG. 11 is a transverse section taken along lines 11—11 of FIG. 9 illustrating the friction drive and fragments of adjacent driven rollers of the transporter, certain parts being cut away.

FIG. 12 is a section taken along lines 12—12 of FIG. 11 illustrating the drive for the left half of the front roller of the transporter.

FIG. 13 is a perspective of one of the dollies, certain parts being cut away to illustrate a fragment of the chain drive which drivingly interconnects the unpowered rollers of the roller bed.

FIG. 14 is a diagrammatic hydraulic circuit for extending and retracting the friction drive.

DESCRIPTION OF THE PREFERRED EMBODIMENT

The cargo handling method and apparatus of the present invention is preferably used for transporting cargo or articles such as pallets P between an aircraft A (FIG. 4) and the cargo terminal CT (FIG. 2) of an airport.

The cargo handling system used in performing the method comprises a well known cargo loader 20 (FIG. 4); one or more terminal storage racks 21 (FIG. 2) each having a drivingly interconnected roller bed 22 which need not be powered; one or more dollies 24 (FIGS. 3 and 13) each having a drivingly interconnected, unpowered roller bed 26; and a self-propelled mobile vehicle hereinafter referred to as a transporter 28 (FIG. 1) provided with a driven roller bed 30 and a retractable friction drive 32.

The cargo loader 20 (FIG. 4) is well known in the art and is a mobile vehicle that is driven into load transfer position adjacent the cargo opening of the aircraft A. The cargo loader 20 does not carry cargo when moving into or away from its cargo transfer position. When in the cargo transfer position, the chassis 34 of the loader is locked in fixed horizontal position by brakes and/or loader supporting jacks (not shown) until the unloading and/or loading operations have been completed. The loader 20 includes a platform 36 having a powered bed 38 of rollers 40 that are selectively driven in clockwise or counterclockwise direction by power originating from the loader. The platform 36 is moved between a lowered pallet receiving position, and an elevated position with the roller bed 38 being in horizontal alignment with driven rollers 42 defining a cargo supporting surface within the aircraft A. The illustrated loader 20 also includes a bridge 44 pivotally connected between the aircraft cargo floor and the platform 36. The bridge 44 is provided with rotatable pallet supporting means such as ball units (not shown) along with pallet driving means such as endless belts for selectively driving the pallets into or out of the aircraft. The illustrated cargo loader 20 is more fully described in assignee's U.S. Pat. No. 3,666,127 which issued to Guyaux on May 30, 1972 and is incorporated by reference herein.

The dollies 24 (FIGS. 3 and 13) are also of well known design and include a chassis 46 which rotatably supports the unpowered roller bed 26. The bed 26 is defined by a plurality of rollers 48 which are drivingly interconnected by a chain drive 50, a fragment of which is shown in FIG. 13.

Each dolly 24 is supported by pairs of rigid rear caster wheels 52 and pairs of swivel caster front wheels 54. Each dolly also includes a vertically pivotable tongue 56 that may be connected to a towing vehicle (not shown) or to other dollies so that a train of dollies may be pulled from the terminal to a point near the aircraft being loaded or unloaded. Each dolly also includes rear wheel brakes 58 which are preferably connected to the associated tongue 56 which locks the brakes when the tongue is moved to the vertical position illustrated in FIG. 3.

The roller bed 22 (FIG. 2) at each terminal storage rack 21 is preferably unpowered, but the rollers are interconnected by a chain drive 60 similar to the chain drive 50 illustrated in FIG. 13.

The transporter 28 (FIGS. 1, 5 and 6) is preferably a flow through transporter that is capable of receiving and discharging pallets P from either end of its driven roller bed 30.

The transporter 28 comprises a chassis 66 that is supported by a pair of rear drive wheels 68 operatively connected to an engine 70 and transmission 72; and by a pair of steerable front wheels 74 controlled by a steering wheel 76 at an operator's station 77. The engine 70 (FIG. 5) also drives a hydraulic pump 78 which drives a hydraulic motor 80 and a chain drive 82 (FIG. 7) that is located on the right side of the transporter 28 and is connected to and drives certain ones of full width rollers 84 that define the aforementioned driven roller bed 30 of the transporter. As indicated in FIG. 7, approximately one-half of the rollers 84 are driven which is sufficient to power the pallets onto or off of the transporter since the full width of each power roller engages and assists in driving the pallet. The usual engine controls, driving controls, and hydraulic controls are provided at the operator station 77, with the hydraulic controls capable of selectively driving the rollers 84 at different speeds and either in the clockwise or counterclockwise direction.

As thus far described, the transporter 28 is of conventional well known design, which conventional transporter is provided with a front roller that is of full width, not a split roller 84a as illustrated in FIGS. 1, 5 and 8.

An important feature of the invention is the addition of the retractable friction drive 32 to one end, preferably to the front of the transporter 28, which addition requires the front roller 84a to be split into two concentric roller portions 84a' and 84a".

In the illustrated preferred embodiment, the retractable friction drive 32 is transversely centered with the roller bed 30, but it will be understood that the friction drive may be located either to the left or to the right of the central longitudinal axis of the roller bed 30 to accommodate existing facilities at certain airports.

The friction drive 32 comprises a sub-frame 100 (FIGS. 9 and 11) which includes a transverse plate 102 bolted to a transverse box beam 104 of the transporter chassis 66. A pair of longitudinal box beam side walls 106,108 are welded to the transverse box beam 104 and have longitudinally extending angle walls 110 and 112 welded thereto and projecting upwardly therefrom. An angle strap 114 is connected to the uppermost portion of the walls 110,112; and the forward ends of the box beams and walls are rigidly secured to the transverse front wall 116 of the chassis 66 to provide the rigid sub-frame 100 for the friction drive. As best shown in FIGS. 1 and 9, the upper portion of the front wall 116 between the side walls 110,112 is slotted at 117 to permit portions of the retractable friction drive to be moved forwardly of the front wall 116 of the chassis 66.

The operative components of the friction drive 32 comprise a pair of upstanding arms 118,120 welded to and held in spaced relationship by a bar 122. A pivot shaft 124 is rotatably received in hubs in the lower ends of the arms 118,120, and are received in holes in the box beams 106,108 (FIG. 11). The shaft 124 is held from rotation and axial movement by a bolt 126 (FIG. 9) extending through the shaft and a tab 127 welded to the adjacent box beam side wall 106.

The upper portion of each arm 118,120 is provided with a slot 128 (FIG. 9) which communicates with a substantially circular opening 129 that receives and centers a roller drive shaft 130 and bearings 132 with the bearings being bolted to the associated arms 118,120 as indicated in FIGS. 9 and 11. A pair of resilient friction drive wheels 134 of rubber or the like are rigidly, but removably secured to a sleeve 136 (FIG. 11) as by clamping the same between end rings 138 bolted to the sleeve and a central ring 140 welded to the sleeve. The sleeve 136 is secured to the shaft 130 for rotation therewith, and a sprocket 142 is secured to one end of the shaft as by bolts and a key. A chain guard 144 is bolted to the arm 118 as a protective feature.

Thus, worn friction wheels may be easily replaced by unbolting and removing the chain guard, the sprocket 142, and the bearings 132 from the shaft and from the arms 118,120; and then removing the rings 138 and friction wheels 134 from the sleeve 136. The new friction wheels are then assembled by reversing the above described procedure.

As best shown in FIGS. 8, 9 and 11, a single upright arm 150 is rigidly secured to a stub shaft 152 which is journaled for pivotal movement within a sleeve 154 secured to the box beam side wall 106. The stub shaft 152 (FIG. 11) is held from axial movement by a hub 156 on the arm 150 and a capscrew and washer assembly 157 screwed into the free end of the stub shaft 152. The upper portion of the arm 150 is provided with a slot 158 that communicates with a substantially circular opening 160 for permitting a reversible hydraulic motor 162 having a drive sprocket 164 secured to its drive shaft 166 to be lowered into and bolted in centered position to the arm 150.

A drive chain 168 is trained around the sprockets 142 and 164 and is tensioned by an adjustable, telescoping link 170 pivotally connected between the arms 118 and 150 by connectors 172,174.

A hydraulic ram 176 is pivotally connected between the arm 120 (FIG. 11) and a bracket 178 (FIG. 9) welded to the plate 102 for pivoting the friction wheels 134 between an extended position as illustrated in FIG. 9 and a retracted position as illustrated in FIG. 10.

When in the extended position, the friction wheels 134 project forwardly of the front wall 116 until they are in driving engagement with the adjacent, or interface, roller 180 of unpowered but drivingly interconnected rollers of a roller bed, such as the foremost rollers on the previously mentioned dolly beds 26 (FIG. 3) and terminal storage rack beds 22 (FIG. 2). As illustrated in FIG. 9, the friction wheels 134 are in their fully extended positions, but it will be understood that driving engagement between the friction wheels 134 and interface rollers 180 preferably occurs prior to reaching its fully extended position.

FIG. 9 also illustrates that the path 182 of travel of the upper peripheral surface of the friction wheels of the preferred embodiment is at all times positioned below the plane 184 of the pallet supporting surface of the transporters roller bed 30.

Although the illustrated embodiment indicates the path of travel of the friction wheels as being below the plane 184, it will be understood that in certain applications it is desirable to have the wheels 134 at or above the plane 184 of the pallet supporting surface.

As best illustrated in FIG. 10, the friction wheels 134 are in their retracted position rearwardly of the front wall 116 and within the confines of the transporter's chassis 66. Thus, when the transporter is used to transfer pallets P between its powered roller bed 30 and another powered roller bed such as the roller bed 38 (FIG. 4) of the loader 20, the front wall 116 of the transporter chassis 66 may be moved into abutting engagement with the adjacent wall of the loader 20 to provide a minimum gap between the adjacent rollers of the two powered beds. In this way, damage to heavily loaded pallets P due to improper or incomplete support is reduced to a minimum.

In the event the operator forgets to retract the friction wheels 134 when moving the front wall 116 of the transporter into abutting engagement with the loader, the hydraulic circuit 175 for the hydraulic ram 176 includes a relief valve RV (FIG. 14) which permits the wheels 134 to automatically retract when pushed against the stationary bed of the loader. In this way damage to the friction drive is minimized.

The hydraulic circuit 175 includes the pump 78 which draws hydraulic fluid from a sump S. When it is desired to extend the wheel 134, a manual valve V is placed in the parallel passage position thereby directing high pressure fluid through line 185 into the hydraulic ram 176 extending the wheel 134. Low pressure fluid is returned through line 186 and valve V to sump S. Retraction of the ram 176 is accomplished by shifting manual valve V to its cross-passage position. When the wheel 134 is extended and the valve V is either in its neutral or parallel-passage position, an excessive retraction force applied to the wheel 134 will cause pressure in line 185 and in a pilot line 187 to open relief valve RV against the urging of a spring thereby preventing or minimizing damage to the friction drive. A second well known relief valve RV2 is opened when valve V is in its neutral position to bypass fluid directly to the sump S.

As mentioned previously, because of the presence of the retractable roller drive 32, the foremost roller 84a, (FIG. 1) of the transporter 28 must be split into two portions. The right portion 84a' of the foremost roller is rotatably mounted on the right wall 190 (FIGS. 1 and 11) of the chassis 66 and on the right wall 112 of the sub-frame 100 as best illustrated in FIG. 11. Also, the previously mentioned roller drive train 82 drives the roller portion 84a'.

The other or left hand portion 84a" of the foremost roller 84a, is mounted for rotation on the left side wall 192 of the transporter chassis 66 and on the wall 110 of the sub-frame 100. In order to drive the left roller portion 84a", a short chain drive 194 (FIG. 12) is provided adjacent the left wall 192 and includes a pair of large sprockets 196 secured to the foremost roller portion 84a", a pair of slightly smaller sprockets 198 secured to the next adjacent full width roller 84, and an endless chain 200 trained around the sprockets 196 and 198. A suitable chain tensioning device 202 is provided for properly tensioning the chain 200 and is supported by the left side wall.

In operation of the preferred embodiment, the cargo loader 20 (FIG. 4) is driven into cargo transfer position adjacent the cargo opening of the aircraft A and is locked in operative position by its brakes or the like. The loader does not carry any cargo when moving into or out of cargo transfer position, and remains in the transfer position until the unloading and/or loading operations have been completed.

During an unloading operation, the loader operator raises the empty platform 36 to the level of the roller bed 42 in the aircraft. When in position to receive pallets P from the aircraft, the powered rollers 40 of the powered roller bed 38 of the loader are driven to assist in moving the pallet P from the aircraft onto the platform 36 as illustrated in FIG. 4. The loader operator then lowers the platform 36 to its lower level.

The operator of the transporter 28 then uses controls at his disposal at the operator station 77 (FIG. 1) to retract the hydraulic ram 176 thereby moving the friction wheel 134 of the retractable friction drive 32 into the retracted positions and beneath the pallet supporting plane as illustrated in FIG. 10. With the friction drive retracted, the transporter operator drives the transporter 28 into abutting engagement with the loader 20 either before, during, or after the transfer of a pallet from the aircraft to the loader 20. With the front end of the transporter chassis and the rear end of the loader chassis positioned in abutting engagement, the loader's powered roller bed 38 and the transporter's powered roller bed 30 are in substantial transverse and planar alignment as indicated in FIG. 4. With the front wall 116 of the transporter 28 abutting the adjacent rear wall of the loader 20, the adjacent rollers of the two driven roller beds 30 and 38 are close together thus minimizing bowing, and resulting damage, of the pallets due to improper support during transfer. In the illustrated preferred embodiment the distance between the axis of the adjacent rollers 84 on the transporter 28 is about 12 inches while the distance between the abutting surface of the front wall 116 and the axis of the adjacent roller 84a is about 5 inches. The positioning of the rearmost roller of the loader 20 varies depending upon the particular type of loader being used. However, in the preferred embodiment of the loader, the distance between the axis of the rear roller of the loader and the abutment surface of the rear wall 116 is also about 5 inches, while the distance between the rear surface of the loaders rear roller and the end wall 116 being about 1 inch. In comparison, when the friction wheels 134 of the preferred embodiment are fully extended, they project in excess of 6 inches forwardly of the front wall 116. Thus, by providing a retractable friction drive as opposed to a nonretractable drive, the spacing between adjacent rollers on the loader and the transporter would be approximately 6 inches less than would occur if the rollers were not retractable.

After the two power beds 30 and 38 have been operated to transfer the pallet P onto the transporter, the transporter is driven along any suitable route to a position immediately adjacent the unpowered roller bed 22 of one of the terminal racks 21; or adjacent the unpowered roller bed 26 of one of the dollies 24 that has its brakes set. When in the transfer position with either of the unpowered roller beds 22 or 26, the transporters brakes are set and the hydraulic ram 176 (FIG. 9) is partially or fully extended until the friction wheels 134 are in firm driving engagement with the adjacent undriven end roller of the beds 22 or 26, respectively. The transporter operator then actuates the reversible hydraulic motor 162 to drive the unpowered roller bed in a direction which moves the pallet P off of the transporter onto said unpowered bed. At this time, the powered roller bed 30 of the transporter is driven by the hydraulic motor and chain drive 82 (FIG. 7) while the associated unpowered roller bed is driven by the friction wheels 134 thus eliminating the need to provide separate power means for the unpowered roller beds.

It will be appreciated that the use of the dollies 24 is preferred when the aircraft A is a considerable distance away from the terminal storage racks 21. It will also be understood that the dollies 24 may be pulled from place to place in trains by a towing vehicle as is conventional in the art.

The aircraft loading operation is substantially the reverse of the above unloading procedure. During loading, the transporter rollers 84 and the friction wheels 134 are driven in the reverse direction for driving the unpowered roller bed thereby withdrawing a pallet P from the unpowered roller bed for acceptance on the transporter's driven roller bed 30. The self propelled, steerable transporter 28 is then driven into abutting engagement with the loader 20 (FIG. 4) after the friction wheels 134 have been retracted at which time the powered roller beds 30 and 38 are both driven in a direction which removes the pallet P from the transporter and places it on the platform 36 of the loader. The platform 36 is then raised to the level of the roller bed 42 in the aircraft, and the pallet is powered into the aircraft by means of the loader's powered roller bed 38 assisted by the powered roller bed 42 in the aircraft A. The loading operation is thus completed for one pallet or article, allowing the transporter to be driven away to repeat the operation with other pallets.

From the foregoing description it is apparent that a method and apparatus is disclosed for transporting cargo such as pallets or containers between a powered roller bed of an aircraft loader or the like and an unpowered roller bed of a terminal rack or trailer. The method includes the use of a mobile, steerable, self-propelled vehicle such as a transporter having a powered roller bed and a retractable friction drive. The retractable friction drive is positioned below the pallet supporting level and is retracted within the confines of the chassis of the transporter when the transporter transfers containers between its powered bed of rollers and another powered bed of rollers to eliminate or minimize the presence of a roller gap between the two driven roller beds. When the driven bed of the transporter is to cooperate with an undriven roller bed, the retractable friction drive is extended to contact and drive the undriven roller bed thus eliminating the need to provide separate power means for these undriven beds.

It will be understood that the transporter, per se, defines a versatile steerable vehicle since it provides an improved retractable friction drive which may be used to drive unpowered rollers when desired, and to be retracted within the transporter's chassis when not in use.

Although the best mode contemplated for carrying out the present invention has been herein shown and described, it will be apparent that modification and variation may be made without departing from what is regarded to be the subject matter of the invention.

I claim:

1. In a steerable self-propelled mobile vehicle having a chassis and a powered bed of rollers thereon, and vehicle supported power means for propelling said vehicle and said rollers; and improvement which comprises a retractable drive wheel rotatably supported near one end of said chassis, means for selectively moving the drive wheel between a retracted position within said chassis and an extended position outwardly of said one end of said chassis, and means for rotating said drive wheel when in its extended position, said vehicle being adapted to be driven into a plurality of stations each having an interconnected bed of unpowered rollers thereon, said vehicle supported power means operatively connected to said drive wheel moving means and said wheel rotating means for driving each of said unpowered bed of rollers when said drive wheel is in its extended position in driving engagement with the associated unpowered bed of rollers.

2. An apparatus according to claim 1 wherein said drive wheel is a friction drive wheel disposed below the level of the upper surface of said powered bed of rollers.

3. In a steerable self-propelled mobile vehicle having a chassis and a powered bed of rollers thereon; the improvement which comprises a retractable friction drive wheel rotatably supported near one end of said chassis, means for selectively moving the drive wheel between a retracted position within said chassis and an extended position outwardly of said one end of said chassis, means for driving said friction wheel when in its extended position, first mounting means supported on said chassis for pivotal movement about a first axis adjacent said one end, a shaft supporting said friction wheel and journaled on said first mounting means above said first axis, second mounting means supported on said chassis for pivotal movement about a second axis, said wheel drive means secured to said second mounting means above said second axis and including a driven output shaft, a chain drive connecting said shafts in driving engagement, and an adjustable link pivotally interconnecting said first and second mounting means for tensioning said chain drive and for defining a parallelogram linkage between said shafts and said axes during movement between said extended and retracted positions.

4. An apparatus according to claim 3 wherein said wheel driving means is a reversible hydraulic motor.

5. An apparatus according to claim 3 wherein said drive wheel moving means is a hydraulic ram pivotally connected between said first mounting means and said chassis.

6. An apparatus according to claim 3 and additionally comprising a pair of bearings for rotatably journaling said friction wheel shaft; said first mounting means including a pair of upstanding arms; means defining slots and substantially cylindrical recesses in the upper ends of said arms; said friction wheel shaft, said friction wheel, and said bearings being installed and removed from said arms as a unit through said slots, and removable connector means for securing said bearings to said arms concentrically with said cylindrical recesses.

7. An apparatus according to claim 6 and additionally comprising a sleeve rigidly secured to said friction wheel shaft; a fixed abutment ring rigidly secured to said sleeve intermediate its ends; a pair of said friction drive wheels being mounted on said sleeve and having inner annular edges in abutting engagement with said fixed abutment ring; and a pair of clamping rings removably connected to said sleeve for clamping said friction drive wheels on said sleeve during normal operation; said clamping rings, when removed from said sleeve permitting easy removal of worn friction wheels and replacement of new friction wheels.

8. An apparatus according to claim 3 wherein the foremost roller of said powered bed of rollers is a split roller defined by two concentric portions, and wherein the path of the friction wheel when moving between said extended and retracted positions is disposed between said roller portions with the uppermost surface of said wheel tracing an arcuate path that is below the container supporting plane of said powered bed of rollers.

9. In a cargo handling system, a steerable self-propelled mobile vehicle having a chassis rotatably supporting a driven roller bed having an article supporting surface for selectively moving articles between the driven roller bed and either the beds of drivingly interconnected rollers of selected ones of a plurality of unpowered first article handling mechanisms or an article supporting bed of powered rollers of a second article handling mechanism when the mobile vehicle is selectively driven in article transfer positions relative to said selected first and said second article handling mechanisms, said vehicle including power means for propelling said vehicle and said rollers; the improvement which comprises a friction drive wheel; reversible motor means connected to said power means and said drive wheel for driving said friction wheel in selective directions; means for supporting said friction drive wheel and said motor means on said vehicle for movement between an extended position wherein said friction drive wheel is disposed forwardly of one end of said chassis in driving engagement with one of the unpowered rollers of the associated unpowered bed of rollers of said first article handling mechanism for driving said unpowered rollers for transferring articles between the bed of said vehicle and said first article handling mechanism, and a retracted position disposed within said chassis and below said article supporting surface for permitting unobstructed transfer of articles between the bed of said vehicle and the driven rollers of said second article handling mechanism; and second motor means operatively connected to said power means for selectively moving said friction wheel between said two positions.

10. A cargo handling system according to claim 9 wherein said mobile vehicle is in said transfer position relative to the second article handling mechanism when one end of said chassis is in abutting relationship with said second article handling mechanism for minimizing the gap between the adjacent end rollers of said two driven roller beds.

11. A cargo handling system according to claim 9 wherein said mobile vehicle is in said transfer position relative to said associated first article handling mechanism when said friction wheel is in its extended position in frictional driving engagement with one of said unpowered rollers.

12. In a cargo handling system, a steerable self-propelled mobile vehicle having a chassis rotatably supporting a driven roller bed for selectively moving articles between the driven roller bed and either a bed of drivingly interconnected rollers of an unpowered first article handling mechanism or an article supporting bed of powered rollers of a second article handling mechanism when the mobile vehicle is selectively driven in transfer positions relative to said first and second article handling mechanisms; the improvement which comprises means defining a parallelogram linkage pivotally mounted on said chassis, first and second parallel upstanding arm means included in said parallelogram linkage, a friction drive wheel rotatably supported by said first arm means, selectively operable reversible motor means connected to said second arm means and having an output shaft, means connecting said output shaft in driving engagement with said friction drive wheel, and selectively operable power means connected to one of said arm means for pivoting said friction drive wheel between a position confined entirely within said chassis and below the article supporting surface of said driven roller bed and a position extending outwardly from one end of said chassis for frictionally engaging and driving the unpowered rollers of the first article handling mechanism when said first mechanism is in transfer position.

13. A cargo handling system according to claim 12 wherein said reversible motor is a hydraulic motor that is selectively operable by hydraulic control means at an operator's station on the vehicle.

14. A cargo handling system according to claim 13 wherein said power means is a hydraulic ram that is selectively operable by hydraulic control means located at an operator's station on the vehicle.

15. A cargo handling system according to claim 13 wherein the end driven roller adjacent said one end of said chassis is split in two concentric sections with said friction drive wheel movable therebetween, and wherein all of said other driven rollers of said vehicle extend the full width of said chassis supported roller bed.

16. In a steerable self-propelled mobile vehicle having a chassis and a powered bed of rollers thereon; the improvement which comprises a retractable friction drive wheel rotatably supported near one end of the chassis, means for selectively moving the drive wheel between a retracted position within said chassis and an extended position outwardly of one end of said chassis, means for driving said friction wheel when in its extended position, and means responsive to abutment of said friction drive wheel against a rigid surface for retracting the wheel from an extended to a retracted position.

17. In a cargo handling system, a steerable self-propelled mobile vehicle having a chassis rotatably supporting a driven roller bed for selectively moving articles between the driven roller bed and either a bed of drivingly interconnected rollers of an unpowered first article handling mechanism or an article supporting bed of powered rollers of a second article handling mechanism when the mobile vehicle is selectively driven in article transfer positions relative to said first and said second article handling mechanisms; the improvement which comprises a friction drive wheel; reversible motor means connected to said drive wheel for selectively driving said friction wheel in selected directions; means for supporting said friction drive wheel and said motor means for movement between an extended position wherein said friction drive wheel is disposed forwardly of one end of said chassis in driving engagement with one of the unpowered rollers of said first article handling mechanism for driving said unpowered rollers for transferring articles between the bed of said vehicle and said first article handling mechanism, and a retracted position disposed within said chassis and below said article supporting surface for permitting unobstructed transfer of articles between the bed of said vehicle and the driven rollers of said second article handling mechanism, power means for selectively moving said friction wheel between said two positions, and means responsive to abutment of said friction drive wheel against a rigid surface for retracting the wheel from an extended to a retracted position.

18. A method according to claim 17 wherein said unpowered bed of rollers is mounted on a dolly horizontally, and additionally comprising the step of moving the dolly to a position near said powered bed of rollers for minimizing the distance the mobile vehicle must be driven.

19. A cargo handling method which uses a steerable self-propelled mobile vehicle for moving articles between a frame supported powered bed of rollers and an unpowered bed of drivingly interconnected rollers; said vehicle including a chassis, a bed of driven rollers rotatably supported by the chassis, and a retractable friction drive wheel rotatably supported near one end of the chassis; said method comprising the steps of driving said vehicle into transfer position adjacent said unpowered bed of rollers, extending the friction wheel into frictional driving engagement with one of the unpowered rollers, selectively driving the friction wheel for driving the unpowered rollers in the desired direction for transferring an article between the unpowered roller bed and the driven roller bed of the vehicle, driving the vehicle between said unpowered roller bed and said powered bed of rollers to move an end of said chassis into a second transfer position relative to the powered bed of rollers, driving the driven rollers on the vehicle and the powered rollers on the frame to move the articles between the driven roller bed of the vehicle and the powered roller bed of the frame, one end of the chassis being in abutting engagement with the frame of the powered bed of rollers when the vehicle is in said second transfer position, and including the additional step of retracting the friction wheel within said chassis prior to moving the chassis into said second transfer position.

20. A method according to claim 19 wherein the unpowered bed of rollers is located in fixed position, said step of extending said friction wheel being effective to move said wheel along an arcuate path below the level of the article supporting surface of the roller beds into engagement with said one unpowered roller after said vehicle has been driven into transfer position adjacent said unpowered bed of rollers.

* * * * *